US007192463B2

(12) United States Patent
Shutty et al.

(10) Patent No.: US 7,192,463 B2
(45) Date of Patent: Mar. 20, 2007

(54) ARRANGEMENT FOR MOUNTING ELECTRICAL COMPONENTS TO AN AFTERTREATMENT FILTER

(75) Inventors: John V. Shutty, Columbus, IN (US); Eric B. Andrews, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 379 days.

(21) Appl. No.: 10/856,389

(22) Filed: May 27, 2004

(65) Prior Publication Data

US 2005/0005773 A1 Jan. 13, 2005

Related U.S. Application Data

(60) Provisional application No. 60/486,487, filed on Jul. 11, 2003.

(51) Int. Cl.

| | |
|---|---|
| ***B01D 50/00*** | (2006.01) |
| ***B01D 59/50*** | (2006.01) |
| ***B01D 46/46*** | (2006.01) |
| ***B01D 53/30*** | (2006.01) |
| ***B01D 46/00*** | (2006.01) |
| ***F02B 27/04*** | (2006.01) |
| ***H01J 50/00*** | (2006.01) |

(52) U.S. Cl. .............................. 55/385.3; 55/DIG. 34; 55/385.5; 55/282.3; 55/DIG. 30; 60/272; 95/1; 95/8; 95/14; 95/15; 95/19; 95/96; 95/273; 95/417; 174/50

(58) Field of Classification Search ............... 55/385.3, 55/385.5, 282.3, DIG. 30, DIG. 34; 95/1, 95/8, 14, 15, 19, 96, 273, 417, 420; 60/272; 174/50

See application file for complete search history.

(56) References Cited

U.S. PATENT DOCUMENTS

| | | | | |
|---|---|---|---|---|
| 3,332,648 | A * | 7/1967 | Selinder | 248/27.3 |
| 4,520,624 | A * | 6/1985 | Kiyota et al. | 60/286 |
| 4,662,911 | A | 5/1987 | Hirayama et al. | |
| 5,089,938 | A * | 2/1992 | White et al. | 361/825 |
| 5,272,874 | A | 12/1993 | Paas | |
| 5,400,991 | A * | 3/1995 | Werner | 248/230.4 |
| 5,651,250 | A * | 7/1997 | Kawamura | 60/303 |
| 6,023,930 | A | 2/2000 | Abe et al. | |
| 6,032,461 | A | 3/2000 | Kinugasa et al. | |
| 6,233,927 | B1 | 5/2001 | Hirota et al. | |
| 6,276,130 | B1 | 8/2001 | Ito et al. | |
| 6,378,297 | B1 | 4/2002 | Ito et al. | |
| 6,490,857 | B2 | 12/2002 | Sasaki | |
| 6,510,686 | B2 | 1/2003 | Kimura et al. | |
| 6,568,178 | B2 | 5/2003 | Hirota et al. | |
| 6,588,204 | B2 | 7/2003 | Hirota et al. | |
| 2003/0131592 | A1 | 7/2003 | Saito et al. | |
| 2003/0167757 | A1 | 9/2003 | Boretto et al. | |
| 2003/0213235 | A1 | 11/2003 | Kitahara et al. | |

* cited by examiner

*Primary Examiner*—Duane Smith
*Assistant Examiner*—Ives Wu
(74) *Attorney, Agent, or Firm*—Barnes & Thornburg LLP

(57) ABSTRACT

An exhaust gas aftertreatment filter system for an internal combustion engine includes an aftertreatment filter disposed in-line with an exhaust gas conduit coupled to an internal combustion engine, a mounting bracket defining a mounting surface and at least one leg extending from the mounting bracket, the at least one leg defining a mounting foot at a distal end thereof with the mounting foot of the at least one leg and the mounting surface of the mounting bracket defining a first air gap therebetween, the mounting foot of the at least one leg secured to the aftertreatment filter, and at least one electrical component secured to the mounting surface of the mounting bracket.

35 Claims, 14 Drawing Sheets

ARRANGEMENT FOR MOUNTING ELECTRICAL COMPONENTS TO AN AFTERTREATMENT FILTER

CROSS-REFERENCE TO RELATED APPLICATION

This application claims priority to, and the benefit of, U.S. provisional patent application Ser No. 60/486,487, filed Jul. 11, 2003 and entitled EXHAUST GAS AFTERTREATMENT SYSTEM, the disclosure of which is incorporated herein by reference.

FIELD OF THE INVENTION

The present invention relates generally to exhaust gas aftertreatment systems, and more particularly to an arrangement for mounting electrical components to an aftertreatment filter.

BACKGROUND OF THE INVENTION

Exhaust gas aftertreatment filter systems are used in internal combustion engine applications to reduce the amount of unwanted emissions, such as oxides of nitrogen and particulates. Typical exhaust gas aftertreatment filter systems include an aftertreatment filter disposed inline with an exhaust conduit fluidly coupled to an exhaust manifold of the engine, and a number of exhaust gas property sensors coupled to the filter or to the exhaust conduit to sense physical properties of the exhaust gas produced by the engine.

SUMMARY OF THE INVENTION

The present invention may comprise one or more of the following features or combinations thereof. An arrangement for mounting at least one electrical component to an aftertreatment filter disposed in-line with an exhaust gas conduit coupled to an internal combustion engine may comprise a mounting bracket defining a mounting surface and at least one leg extending from the mounting bracket, with the at least one leg defining a mounting foot at a distal end thereof. The mounting foot of the at least one leg and the mounting surface of the mounting bracket may define a first air gap therebetween. The mounting foot of the at least one leg is secured to the aftertreatment filter, and the at least one electrical component is secured to the mounting surface of the mounting bracket.

Another arrangement for mounting at least one electrical component to an aftertreatment filter disposed in-line with an exhaust gas conduit coupled to an internal combustion engine may comprise a mounting bracket defining a first mounting surface secured to the aftertreatment filter and a second mounting surface. The at least one electrical component may be mounted to the second mounting surface of the mounting bracket with an air gap defined therebetween such that the air gap extends between the at least one electrical component and the aftertreatment filter.

A further arrangement for mounting at least one electrical component to an aftertreatment filter disposed in-line with an exhaust gas conduit coupled to an internal combustion engine may comprise a mounting bracket defining a first mounting surface secured to the aftertreatment filter and a second mounting surface, and a thermal insulating member extending over the second mounting surface of the mounting bracket. The at least one electrical component may be mounted to the second mounting surface of the mounting bracket with the thermal insulating member disposed therebetween.

These and other features of the present invention will become more apparent from the following description of the illustrative embodiments.

DESCRIPTION OF THE ILLUSTRATIVE EMBODIMENTS

Figure 1:
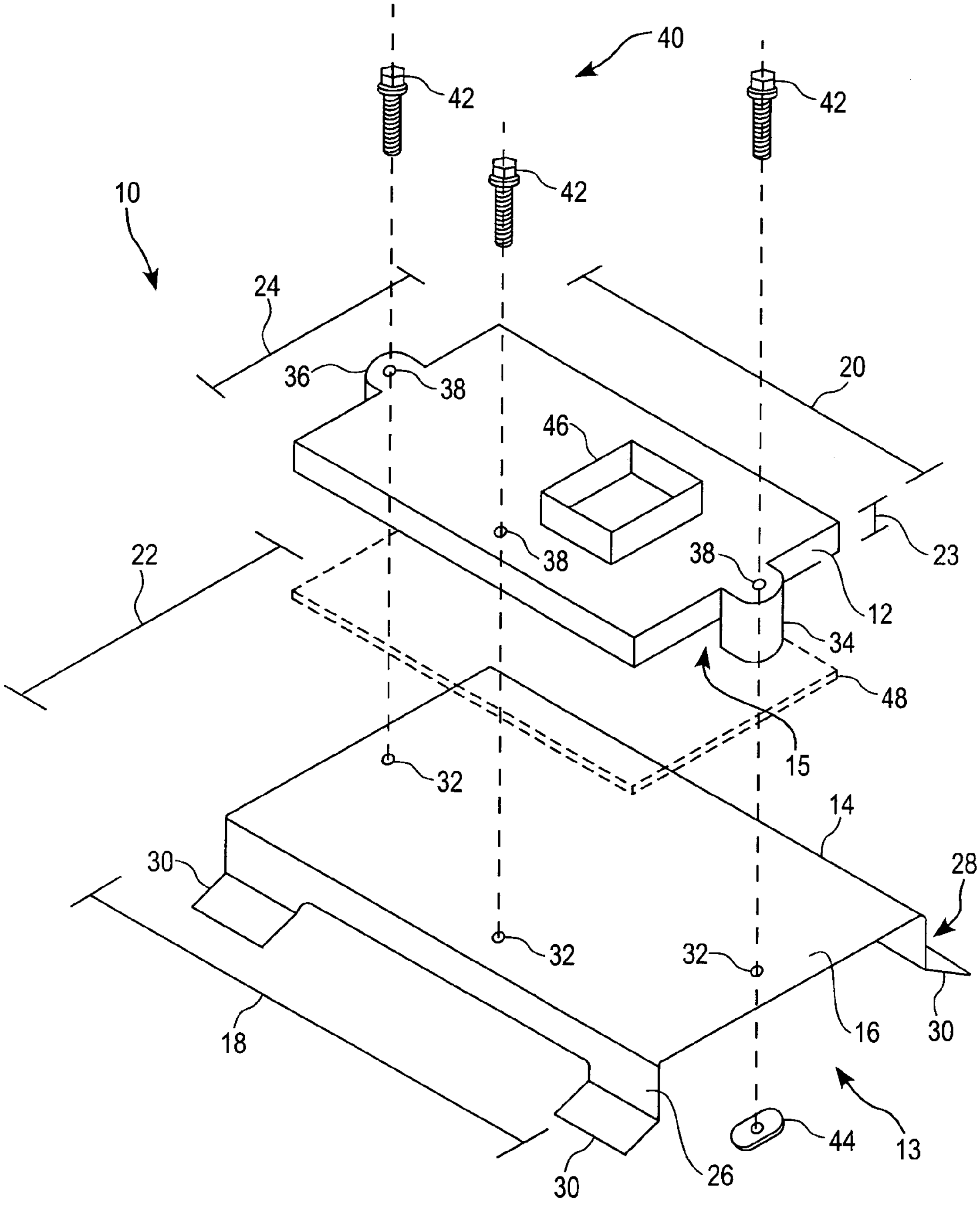
FIG. 1 is a diagrammatic illustration of one embodiment of an exhaust gas aftertreatment filter system.

For the purposes of promoting an understanding of the principles of the invention, reference will now be made to a number of illustrative embodiments shown in the drawings and specific language will be used to describe the same. It will nevertheless be understood that no limitation of the scope of the invention is thereby intended. For example, it should be understood that the exhaust gas aftertreatment filter system described below and illustrated in the associated figures is at least a portion of a complete exhaust gas aftertreatment filter system and that such a complete exhaust gas aftertreatment filter system may include additional and/or alternative sensors, control and/or computer modules, mounting devices, and the like.

Referring now to FIG. 1, one illustrative embodiment of an exhaust gas aftertreatment filter system 10 includes a control module 12 and a mounting bracket 14 configured to receive the module 12. The bracket 14 is formed from a metallic material such as steel or other rigid material and includes a relatively flat top surface 16. The top surface 16 has a length 18 substantially equal to or exceeding the length 20 of the module 12 and a width 22 substantially equal to or exceeding the width 24 of the module 12 so as to provide sufficient surface area for the module 12 to be secured to the mounting bracket 14. The bracket 14 also includes a first and second side 26, 28, respectively, which extend away from the top surface 16 in a downwardly direction. A number of mounting feet 30 protrude from the bottom of the sides 26, 28. In one embodiment, the mounting feet 30 protrude from the sides 26, 28 at an angle which substantially matches the curvature of a cross-section of the aftertreatment filter to which the bracket 14 is secured. For example, if the aftertreatment filter has a circular cross-section, the mounting feet 30 will protrude from the sides 26, 28 at such an angle as to provide suitable support to the sides 26, 28 and the top surface 16 when the bracket 14 is secured to the aftertreatment filter. In some embodiments, the top surface 16 of the bracket 14 may also include a number of mounting holes 32.

The physical configuration of the illustrated control module 12 may be one of a number of possible configurations of exhaust gas aftertreatment filter system control modules. In the embodiment illustrated in FIG. 1, the control module 12 has a substantially rectangular top profile with a first and second mounting protrusion 34, 36, respectively, extending outwardly from the sides of the module 12 which define the width 24 of the module 12. The mounting protrusions 34, 36, extend downwardly a distance greater than the thickness 23 of the module 12 so as to create an air gap 15 between the module 12 and the top surface 16 after the module is secured to the mounting bracket 14. In other embodiments, the protrusions 34, 36 may not extend a distance greater than the thickness 23 of the module 12, and in such embodiments the air gap 15 may be created by positioning a number of spacers (not shown) between the module 12 and the mounting bracket 14. In any case, when the control module 12 is secured to the mounting bracket 14, the air gap 15 is positioned between the module 12 and the top surface 16 of the bracket 14. In such a position, the air gap 15 acts to thermally isolate the module 12 from heat generated by an aftertreatment filter to which feet 30 of bracket 14 are mounted.

Each of the protrusions 34, 36 includes a mounting hole 38. Additionally, the module 12 includes a mounting hole 38 located centrally toward a length side of the module 12. The mounting holes 38 of the module 12 substantially align with the mounting holes 32 of the mounting bracket 14 when the module 12 is positioned on the bracket 14.

In some embodiments, the module 12 may include a connecter 46 which is electrically coupled to a number of electrical devices included in the module 12. In one embodiment, the connector 46 is configured for electrical connection to a Society of Automotive Engineers (SAE) J1939 hardware network configured for communications according to SAE J1939 communications protocol; however, other connector 46 configurations may be used. For example, connector 46 may be an SAE J1708 hardware network configured for communications according to SAE J1587 communications protocol, an RS-232 connector, a Universal Serial Bus (USB) connector, or other type of connector operable to connect the module 12 to other electrical systems or devices.

A number of securing devices 40 are used to secure the module 12 to the bracket 14. In the embodiment illustrated in FIG. 1, the securing devices 40 include a number of bolts 42 and nuts 44. When the module 12 is secured to the bracket 14, the bolts 42 extend through the mounting holes 38 of the module 12 and the mounting holes 32 of the bracket 14 and operably couple with the nuts 44 positioned on the underside of the top surface 16. In other embodiments, alternative securing devices 40 may be used. For example, clamps, high-temperature adhesives or epoxies, straps, and/or other devices operable to secure the module 12 to the bracket 14 may be used.

The sides 26, 28 and the top surface 16 cooperate to form an air gap 13 between the top surface 16 of the bracket 14 and the mounting feet 30 extending from the sides 26, 28. When the module 12 is mounted to the bracket 14 and the bracket is mounted to an aftertreatment filter via feet 30, the air gap 13 is positioned between the filter and the top surface 16 of the mounting bracket 14 and acts to thermally isolate the module 12 from heat generated by the aftertreatment filter.

In some embodiments, a thermal insulating device 48 may be positioned between the module 12 and the mounting bracket 14. The thermal insulating device 48 may be made from any of a number of known thermally insulative materials such as compounds of ceramic or other known thermally insulative materials or compounds. The thermal insulating device 48 is positioned between the module 12 and the mounting bracket 14 and secured in place by the compacting pressure exerted on the insulator 48 by the module 12 after the module 12 is secured to the bracket 14. Alternatively, the insulating device 48 may include a number of mounting holes which substantially align with mounting holes 32, 38, wherein device 48 may be secured to the module 12 and mounting bracket 14 by the cooperation of the securing devices 40.

Although the illustrative embodiment illustrated in FIG. 1 includes a control module 12 having a rectangular top profile and a number of mounting protrusions 34, 36, modules 12 having other configurations are contemplated. For example, control modules 12 having square, circular, and other geometrical top profiles may be used. In addition, depending upon the application, the control module 12 may include any number of mounting protrusions 34, 36 operable to secure the module 12 to the mounting bracket 14. Further, in some embodiments, the module 12 may not include any mounting protrusions 34, 36 and, alternatively, be configured to mount to the bracket 14 using high temperature adhesives, mounting straps, fixation members or the like. In other embodiments, the module and bracket 14 may be integrated into a single, unitary package using known overmolding or other known techniques.

Figure 2:
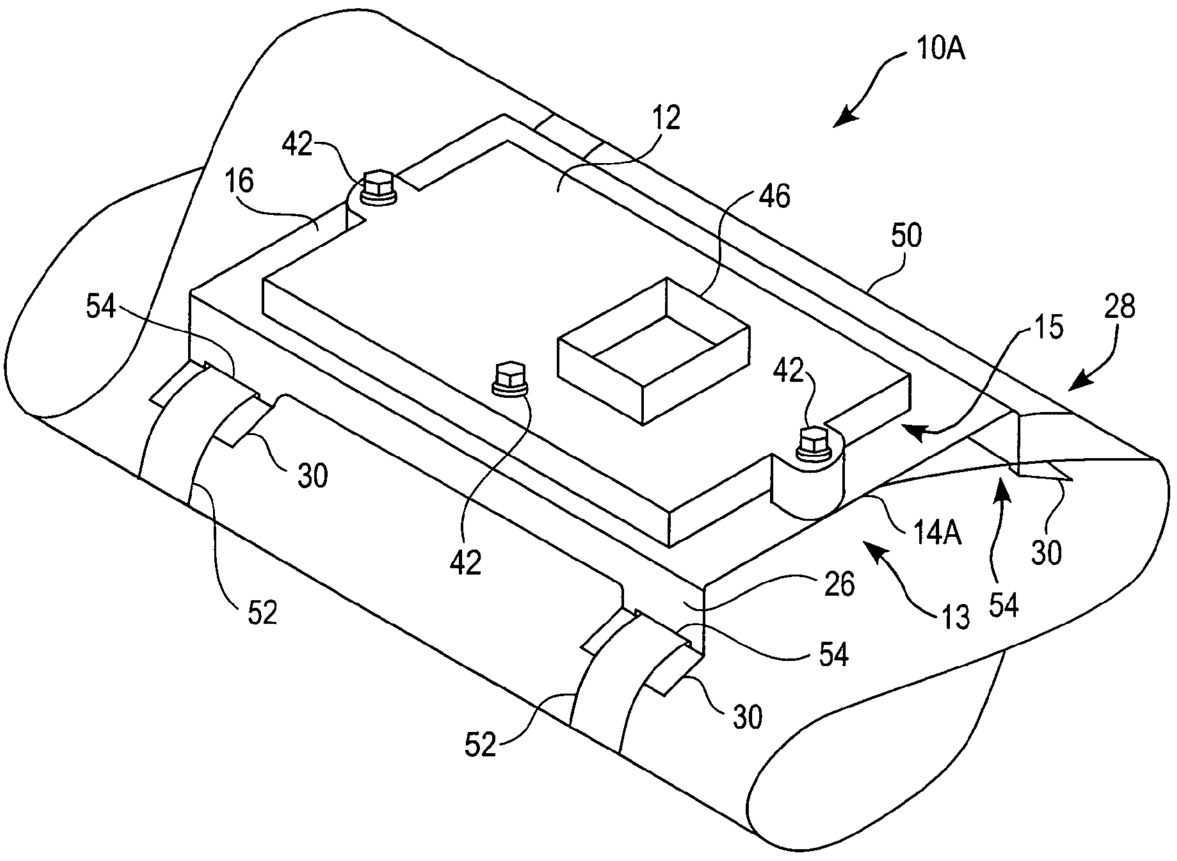
FIG. 2 is a diagrammatic illustration of another embodiment of an exhaust gas aftertreatment filter system.

Referring now to FIG. 2, another embodiment of an exhaust gas aftertreatment filter system 10A is shown. System 10A includes a control module 12 and a mounting bracket 14A secured to an exhaust gas aftertreatment filter 50 via a number of securing straps 52. The straps 52 extend through a number of strap openings 54 in the sides 26, 28 of the mounting bracket 14A. The openings 54 are positioned on the sides 26, 28 of the bracket 14A in a position relatively close to the mounting feet 30 so that the straps 52 apply a centripetal force against the mounting feet 30 when the straps 52 are properly secured. The straps 52 may be secured around the filter 50 using a variety of securing devices which are operable to tighten the straps about the filter. For example, the straps 52 may be tightened by the operation of a screw device, snap device, or other coupling device operable to tighten and hold the circumferential position of the straps 52. As the straps 52 are tightened, the straps 52 exert a centripetal force about the circumference of the filter 50 including across the mounting feet 30 of the mounting bracket 14A. The centripetal force applied to the mounting feet 30 by the straps 52 secure the mounting feet 30 and the mounting bracket 14A in a fixed position on the filter 50. After the mounting bracket 14A is secured to the filter 50 via the straps 52, the air gap 13 is defined between the surface of the filter 50 and the top surface 16 of the mounting bracket 14A. The air gap 13 between the filter 50 and the top surface 16 of the bracket 14A acts to thermally isolate the module 12 from heat generated by the aftertreatment filter 50.

The control module 12 is secured to the mounting bracket 14A using a number of securing devices 42; e.g., bolts or other known fixation members. When the control module 12 is secured to the mounting bracket 14A, the air gap 15 is positioned between the module 12 and the top surface 16 of the bracket 14A. In such a position, the air gap 15 further acts to thermally isolate the module 12 from heat generated by the aftertreatment filter 50. Additionally, the exhaust gas aftertreatment filter system 10A may include a thermal insulating device (not shown), such as device 48 illustrated in FIG. 1, positioned between the control module 12 and the mounting bracket 14A to provide further thermal insulation between the module 12 and heat generated by operation of the aftertreatment filter 50.

Figure 3:
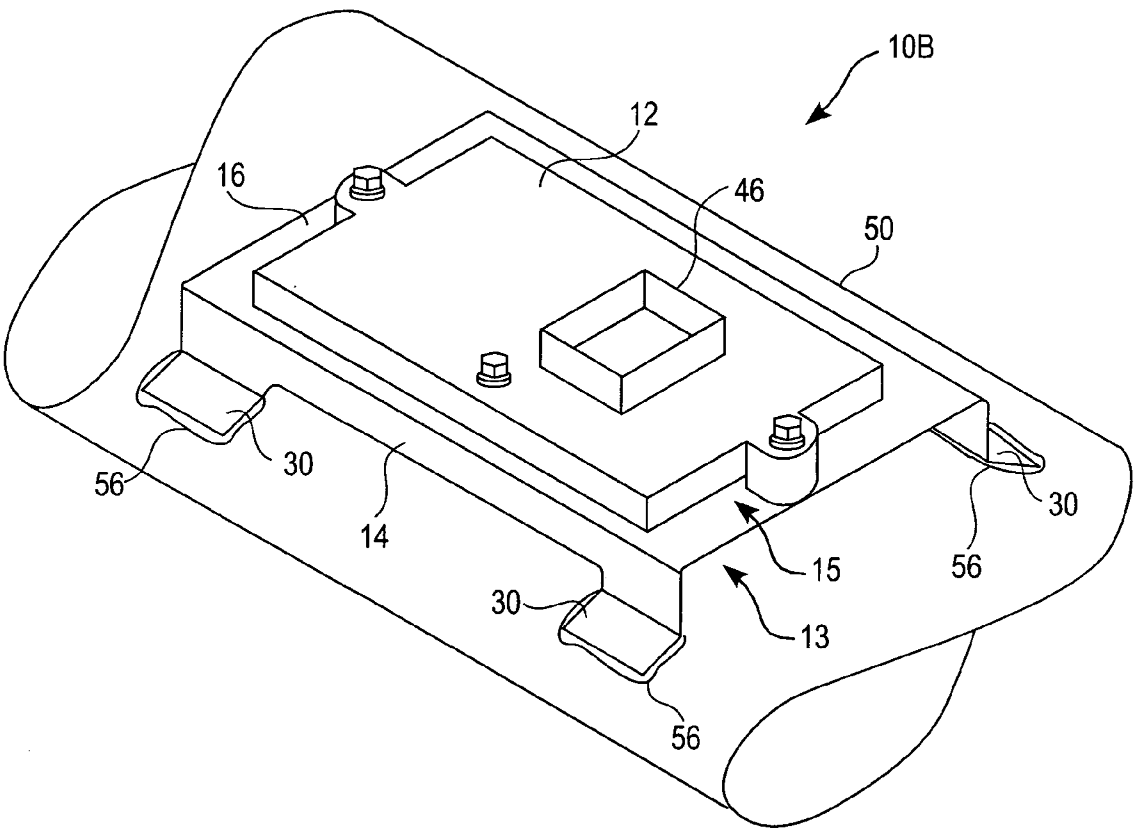
FIG. 3 is a diagrammatic illustration of yet another embodiment of an exhaust gas aftertreatment filter system.

In yet another embodiment, an exhaust gas aftertreatment filter system 10B includes a control module 12 and a mounting bracket 14 secured to an aftertreatment filter 50 via a number of welds 56, as illustrated in FIG. 3. The bracket 14 includes a number of mounting feet 30, which are welded to the surface of the filter 50 using known welding methods and techniques. Welding the feet 30 to the filter 50 rigidly secures the mounting bracket 14 in a fixed position relative to the filter 50. In this position, the air gap 13 is positioned between the surface of the filter 50 and the top surface 16 of the bracket 14 and acts to thermally insulate the control module 12 from heat generated by the aftertreatment filter 50. Additionally, the exhaust gas aftertreatment filter system 10B may include a thermal insulating device (not shown), such as device 48 in FIG. 1, positioned between the control module 12 and the mounting bracket 14 to provide further thermal insulation between the module 12 and heat generated by operation of the aftertreatment filter 50. In an alternate embodiment, the welds 56 may represent epoxy welds formed from one of a variety of known high temperature adhesive epoxies. The adhesive epoxy secures the mounting bracket 14 in a fixed position relative to the filter 50 similar to the function of the welds 56.

Figure 4:
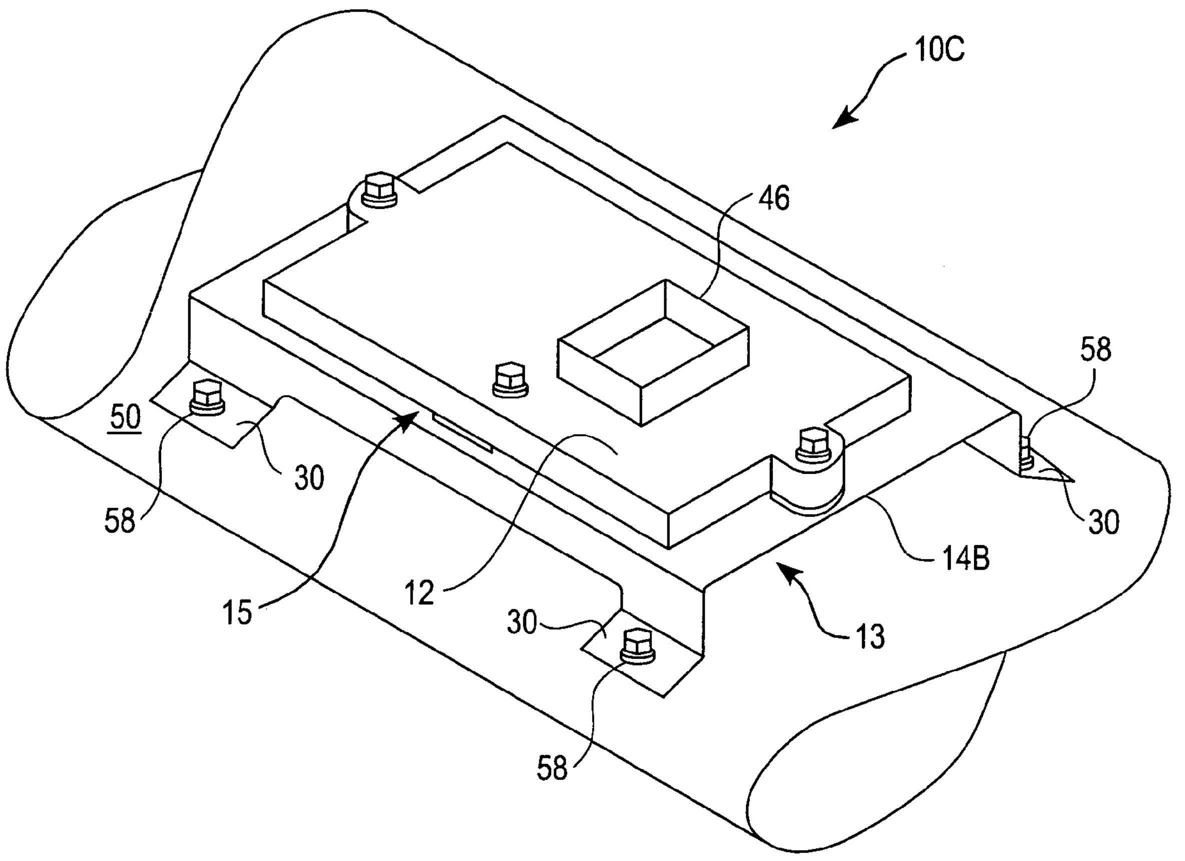
FIG. 4 is a diagrammatic illustration of a further embodiment of an exhaust gas aftertreatment filter system.

Referring now to FIG. 4, a further embodiment of an exhaust gas aftertreatment filter system 10C includes a control module 12 and a mounting bracket 14B secured to an aftertreatment filter 50 via a number of bolts 58. The mounting bracket 14B includes a mounting hole (not shown) in each of the mounting feet 30. The bolts 58 are positioned in the mounting holes of the mounting feet 30 and secured into the surface of the filter 50. In the embodiment illustrated in FIG. 4, the bolts 58 include a threaded screw capable of piercing the surface of the filter 50 and securing the mounting bracket 14B to the filter 50. In embodiments providing access to the underside of the outer surface of the filter 50, the bolts 58 may be secured using bolt nuts or other similar securing devices. Nonetheless, the bolts 58 secure the mounting bracket 14B to the filter 50 in a substantially fixed position. The air gap 13 is positioned between the surface of the filter 50 and the top surface 16 of the bracket 14 and acts to thermally insulate the module 12 from heat generated by the operation of the aftertreatment filter 50. The air gap 15 is positioned between mounting bracket 14 and the module 12 to provide further thermal insulation between the module 12 and heat generated by operation of the filter 50. Additionally, system 10C may include a thermal insulating device (not shown), such as device 48 in FIG. 1, positioned between the module 12 and the mounting bracket 14 to provide still further thermal insulation between the module 12 and heat generated by operation of the filter 50.

Figure 5:
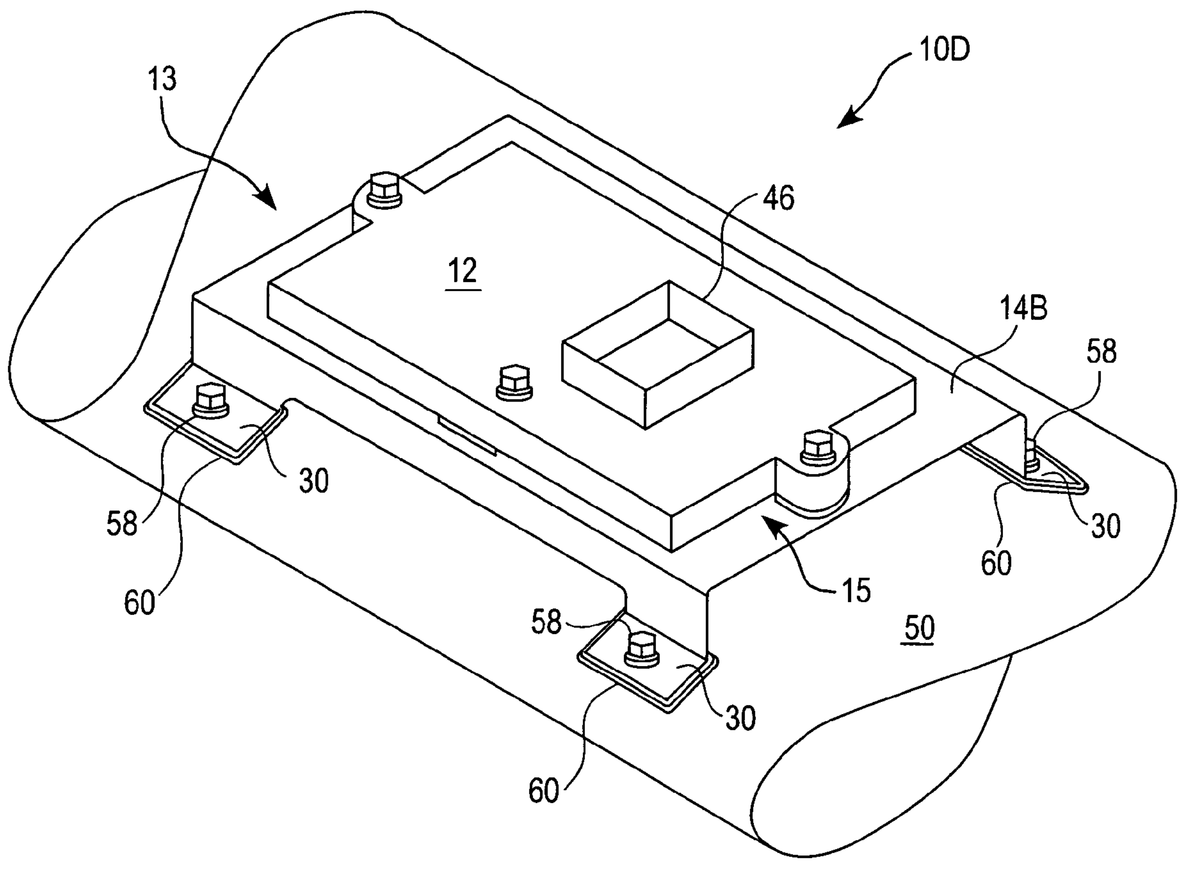
FIG. 5 is a diagrammatic illustration of yet a further embodiment of an exhaust gas aftertreatment filter system.

In yet a further embodiment, an exhaust gas aftertreatment filter system 10D includes a control module 12, a mounting bracket 14B secured to an aftertreatment filter 50, and a number of thermal insulators 60, as illustrated in FIG. 5. The thermal insulators 60 are positioned between a number of feet 30 of the mounting bracket 14B and the outer surface of the filter 50. Illustratively, the thermal insulators 60 are oval in shape and include relatively flat top and bottom surfaces having sufficient surface area to support the feet 30 of the bracket 14B. The mounting feet 30 may be secured to the filter 50 using any of a number of known securing devices. For example, straps similar to the straps 52 illustrated in FIG. 2, welds similar to the welds 56 illustrated in FIG. 3, bolts similar to the bolts 58 illustrated in FIG. 4, and/or other securing devices may be used to secure the bracket 14B to the filter 50 so as to position the thermal insulators 60 between the mounting feet 30 of the bracket 14B and the outer surface of the filter 50. In the embodiment illustrated in FIG. 5, a number of bolts 58 are used to secure the bracket 14B to the filter 50 and position the insulators 60 between the feet 30 and the filter 50. In embodiments using bolts 58 or other similar securing devices, each of the thermal insulators 60 include a mounting hole (not shown) through which the bolt 58 extends after the bracket 14B is secured to the filter 50. The thermal insulators 60 act to inhibit the transfer of heat generated by operation of the aftertreatment filter 50 to the top surface 16 of the mounting bracket 14B via feet 30 and sides 26. Additionally, a thermal insulating device (not shown), such as the device 48 in FIG. 1, may be positioned between the module 12 and the mounting bracket 14B to provide further thermal insulation between the module 12 and heat generated by operation of the filter 50.

Figure 6:
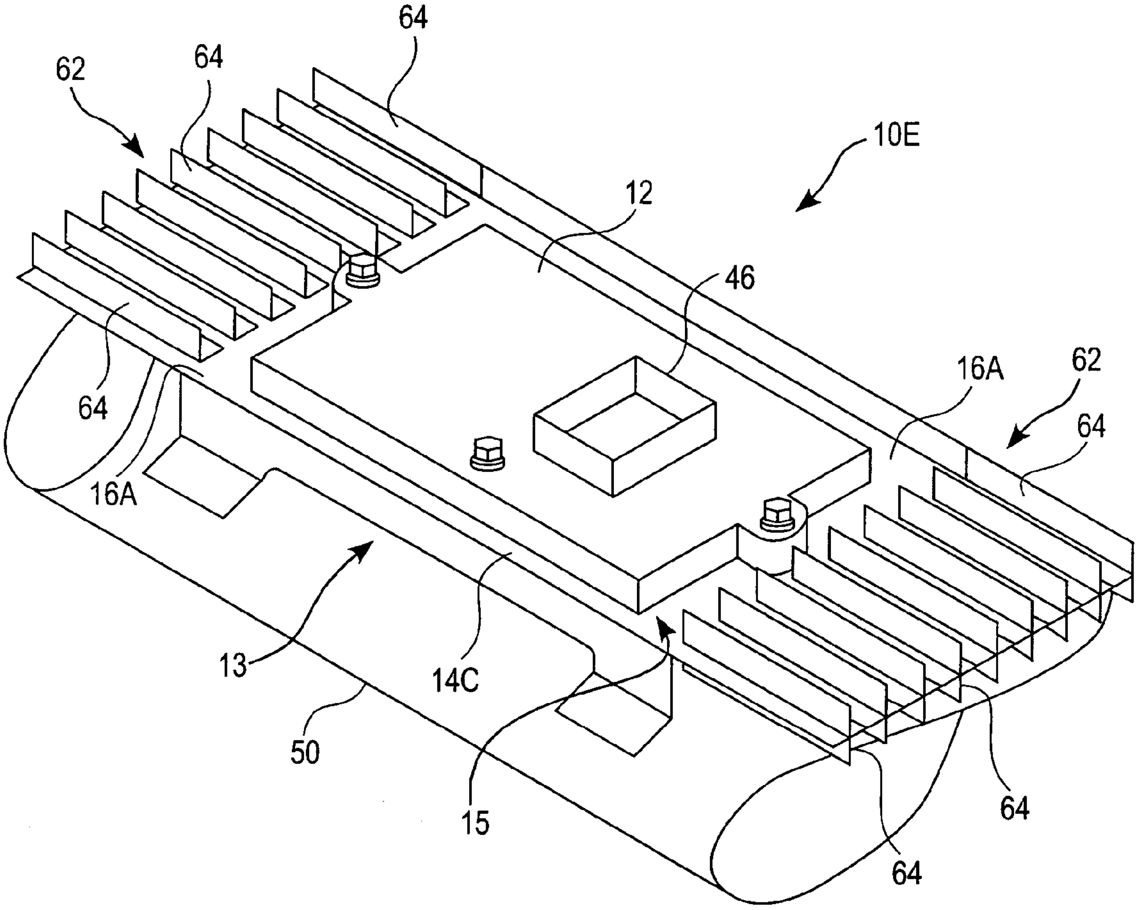
FIG. 6 is a diagrammatic illustration of yet a further embodiment of an exhaust gas aftertreatment filter system.

Referring now to FIG. 6, yet a further embodiment of an exhaust gas aftertreatment filter system 10E includes a control module 12 and a mounting bracket 14C secured to an aftertreatment filter 50, wherein the mounting bracket 14C includes a plurality of heat sink fins 62 extending therefrom. The bracket 14C may be secured to the filter 50 using any known securing technique, such as any one or more of the securing techniques described hereinabove with respect to FIGS. 2–5. In the illustrated embodiment, the plurality of heat sink fins 62 are defined by, or attached to, the top surface 16A of the mounting bracket at opposite longitudinal ends thereof, and extend away from surface 16A in opposite directions. It is to be understood that FIG. 6 represents only one illustrative arrangement of the heat sink fins 62, and that other configurations and arrangements of heat sink fins may be used. For example, the heat sink fins 62 may extend away from bracket 14C in a latitudinal direction. Alternatively or additionally, the heat sink fins 62 may include a number of vertical fin elements 64 as illustrated in FIG. 6, although the fin elements 64 may alternatively be slanted, offset, or otherwise non-vertical. In any case, the heat sink fins 62 increase the total surface area of the mounting bracket 14C, and thereby act to improve the heat dissipation capability of the bracket 14C. In some embodiments, the exhaust gas aftertreatment filter system 10E may include a cooling fan (not shown) configured to move air across the heat sink fins 62 to further improve the thermal dissipation capability of the bracket 14C. Additionally, system 10E may include air gaps 13 and/or 15 as described hereinabove, and/or a thermal insulating device such as the thermally insulating device 48 illustrated in FIG. 1, to provide a desired level of thermal insulation between the module 12 and heat generated by the operation of the aftertreatment filter 50.

Figure 7:
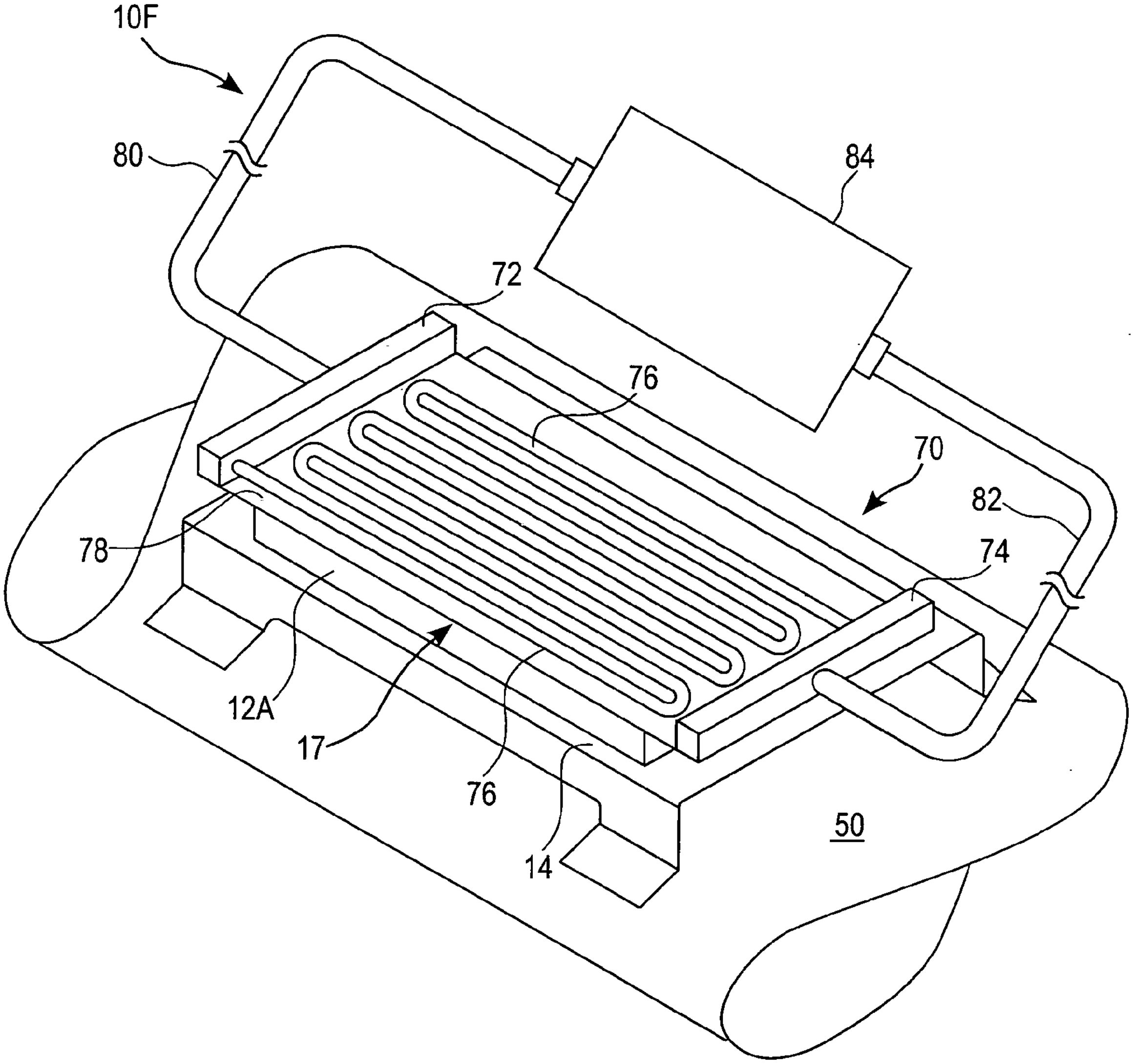
FIG. 7 is a diagrammatic illustration of yet a further embodiment of an exhaust gas aftertreatment filter system.

In yet a further embodiment, an exhaust gas aftertreatment filter system 10F includes a control module 12, a mounting bracket 14, and a cooling element 70, as illustrated in FIG. 7 The control module 12 is secured to the mounting bracket 14 using any suitable securing device, such as the securing devices described hereinabove with respect to FIG. 1. Similarly, the bracket 14 may be secured to the filter 50 using any suitable securing devices, such as any one or more of the securing devices described hereinabove with respect to FIGS. 2–5.

The cooling element 70 illustrated in FIG. 7 includes an intake reservoir 72, an outlet reservoir 74, a cooling conduit 76, and a cooling surface 78. The cooling element 70 is positioned on the module 12 such that the cooling surface 78 is in contact with a top surface 17 of the module 12. The cooling surface 78 is rectangular in shape having two longitudinal edges and two latitudinal edges. The reservoirs 72, 74 are secured to the cooling surface 78 along separate latitudinal edges. The cooling conduit 76 is fluidly coupled between the reservoirs 72, 74 and extends between the reservoirs 72, 74 along a serpentine path in contact with a major portion of the cooling surface 78. An intake conduit 80 is also coupled to the intake reservoir 72. Similarly, an outlet conduit 82 is coupled to the outlet reservoir 74. The conduits 80, 82 fluidly couple the cooling element 70 to a cooling fluid reservoir 84. The cooling fluid reservoir 84 may contain any known fluid capable of drawing heat from the module 12 and/or of regulating the operating temperature of the module 12 as the fluid passes through the cooling element 70. In one embodiment, the cooling fluid reservoir 84 may contain Urea fluid used, for example, in other exhaust gas aftertreatment components. Alternatively, the cooling fluid reservoir 84 may represent a typical cooling system associated with the engine, wherein reservoir 84 includes conventional engine cooling fluid. In any case, the fluid contained in the reservoir 84 is pumped through the cooling element 70 via a pump (not shown) located in the reservoir 84 or coupled in-line to one of the conduits 80, 82. As the fluid passes through the cooling element 70, the fluid improves the thermal conditions of the control module 12 through the conduction of heat away form the module 12. Additionally, a number of air gaps (not shown), thermal insulating devices (not shown) and/or cooling fins (not shown) may be used to further thermally insulate module 12 from heat generated by the operation of filter 50 and/or to draw additional heat away from module 12, as described hereinabove with respect to FIGS. 1–6.

Figure 8:
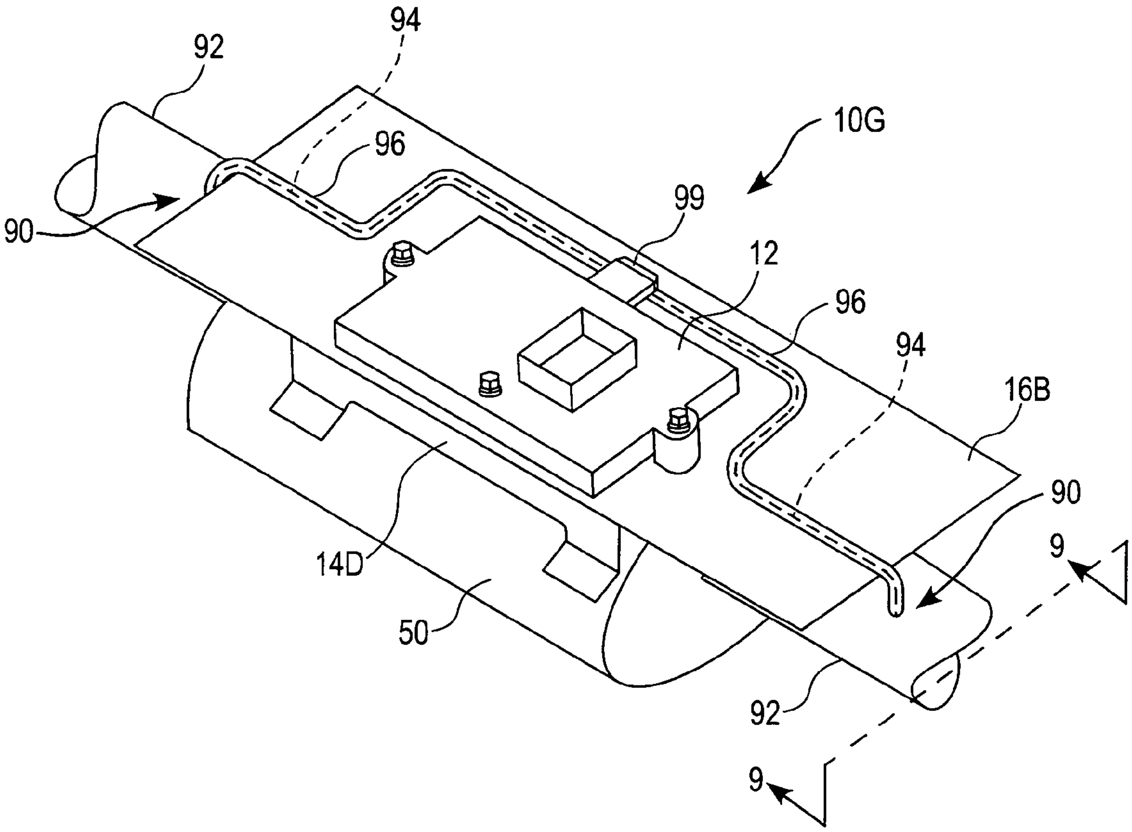
FIG. 8 is a diagrammatic illustration of yet a further embodiment of an exhaust gas aftertreatment filter system.
Figure 9:
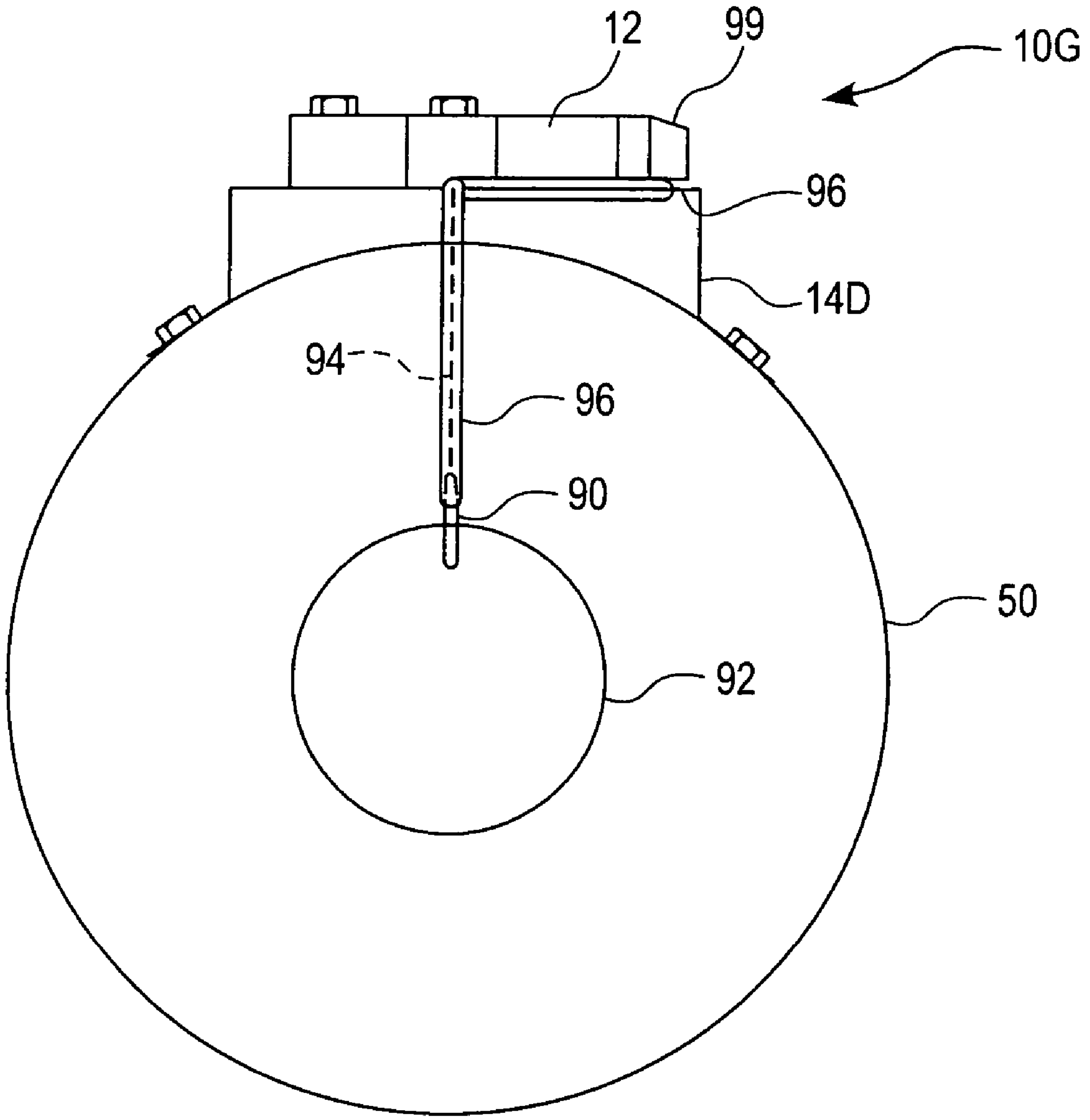
FIG. 9 is a diagrammatic illustration of the exhaust gas aftertreatment filter system of FIG. 8 taken generally along section lines 9—9 of FIG. 8.

Referring now to FIGS. 8–14, one or more exhaust gas property sensors may be disposed in fluid communication with the exhaust gas upstream of filter 50, downstream of filter 50, and/or through filter 50, and electrically coupled to a control module 12 of the exhaust gas aftertreatment filter system 10. For example, as illustrated in FIGS. 8 and 9, an exhaust gas aftertreatment filter system 10G includes a control module 12, and two temperature sensors 90 electrically coupled to the control module 12. The filter system 10G includes a mounting bracket 14D having a top surface 16B that extends past the longitudinal ends of the filter 50. Each of the temperature sensors 90 is secured to and extend into the exhaust conduit 92 adjacent opposite ends of the filter 50. The sensors 90 are electrically coupled to the control module 12 via electrical interconnects 94. The interconnects 94 are electrically coupled to the control module 12 through a harness and connector assembly 99. The interconnects 94 traverse from the sensors 90 to the assembly 99 through interconnect conduits 96. The conduits 96 are configured to guide and restrain the free movement of the electrical interconnects 94 so as to improve the susceptibility of the interconnects 94 to the local harsh environment, and to further thermally isolate the interconnects 94 from heat generated by operation of the filter 50. In the illustrated embodiment, the conduits 96 are secured to the top surface 16B of the bracket 14D, and extend away from the module 12 along the surface 16B to the opposite ends of the top surface 16B, and then downwardly from the surface 16B toward the exhaust conduit 92 so as to at least partially cover the temperature sensors 90, as illustrated in FIG. 9. Alternatively, the interconnects 94 may extend from the sensors 90 to the harness and connector assembly 99 through a series of standoffs (not shown) which secure and elevate the interconnects 94 away from the surface 16B of the bracket 14D.

In operation, the temperature sensors 90 may provide module 12 with exhaust gas temperature change, or delta-temperature, between the two exhaust conduits 92 on either longitudinal end of the filter 50, or may instead be used to provide module 12 with filter inlet exhaust gas temperature and filter outlet exhaust gas temperature information. Alternatively, either one of the temperature sensors 90 may be positioned to determine exhaust gas temperature internal to the filter 50. Alternatively still, system 10G may include only a single temperature sensor, positioned at the filter inlet, the filter outlet or internal to the filter 50, and configured in any case to provide module 12 with exhaust gas temperature at the sensor location.

Figure 10:
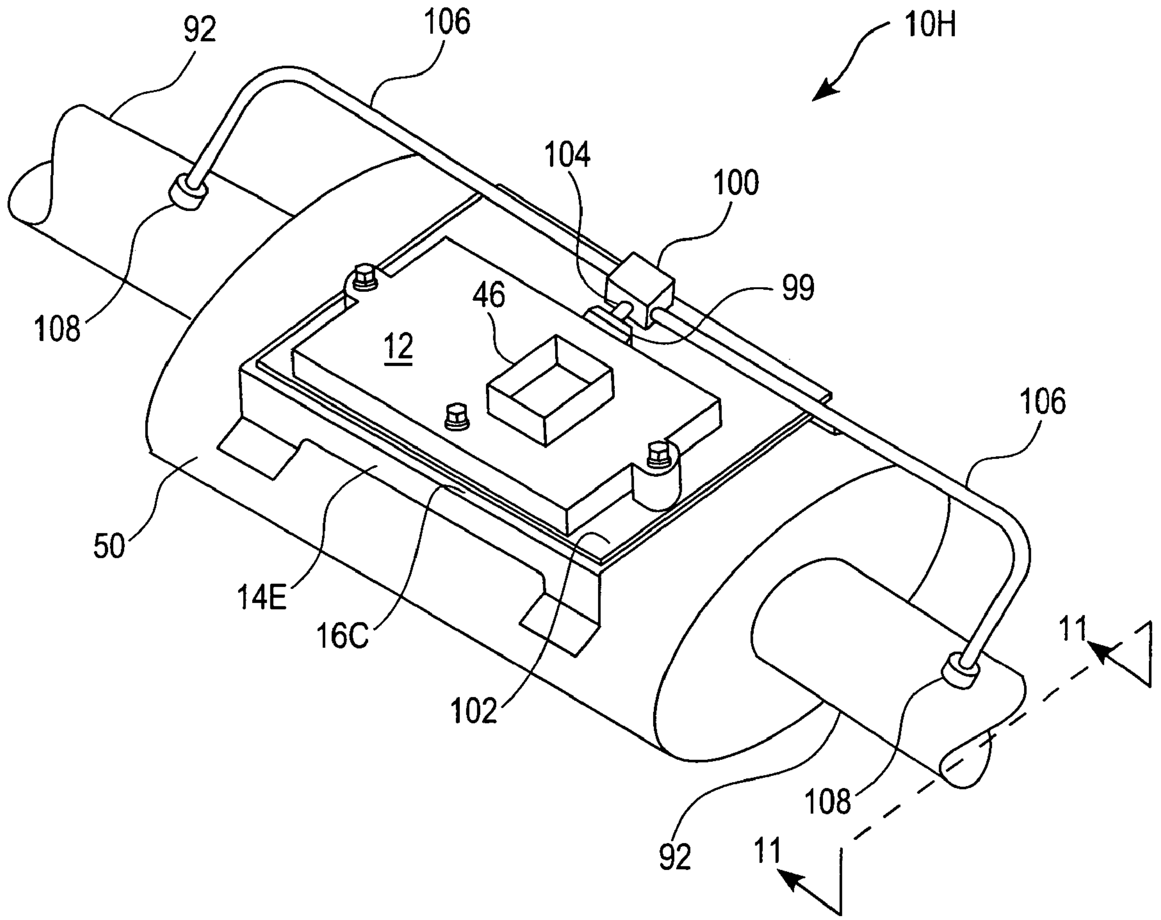
FIG. 10 is a diagrammatic illustration of yet a further embodiment of an exhaust gas aftertreatment filter system.
Figure 11:
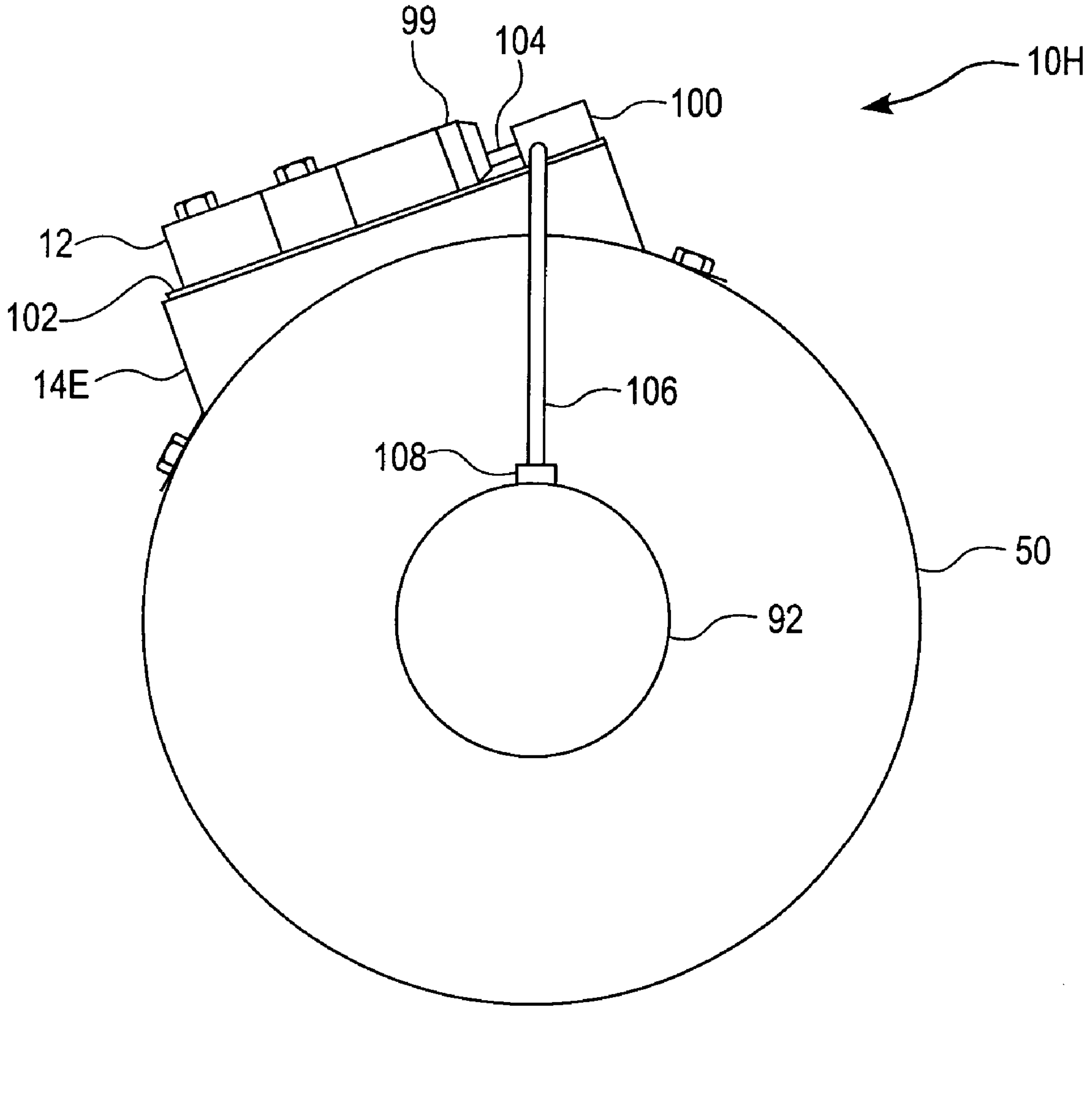
FIG. 11 is a diagrammatic illustration of the exhaust gas aftertreatment filter system of FIG. 10 taken generally along section lines 11—11 of FIG. 10.

Referring now to FIGS. 10 and 11, another illustrative embodiment of an exhaust gas aftertreatment filter system 10H includes a mounting bracket 14E secured to an aftertreatment filter 50 positioned inline with an exhaust conduit 92, a control module 12 secured to the bracket 14E, and a pressure sensor 100 electrically coupled to the module 12. The sensor 100 is also fluidly coupled to the exhaust conduit 92 at opposite longitudinal ends of the filter 50. The module 12 and sensor 100 are secured to the bracket 14E using suitable securing devices such as those devices described above in regard to FIG. 1. The sensor 100 is electrically coupled to the module 12 via a number of electrical interconnects (not shown) which traverse through conduit 104. The interconnects (not shown) are electrically coupled to the control module 12 through a harness and connector assembly 99. In the illustrated embodiment, pressure sensor 100 is a so-called "delta pressure sensor" having opposing inlets and producing a pressure signal indicative of the pressure differential between the opposing inlets. A pair of conduits 106 fluidly couple each of the opposing inlets of the delta pressure sensor 100 to the exhaust gas flowing through exhaust conduits 92, wherein a first conduit 106 extends between one inlet of the pressure sensor 100 and the exhaust gas upstream of the filter 50 and a second conduits extends between the other inlet of the pressure sensor 100 and the exhaust gas downstream of the filter 50. In the illustrated embodiment, the conduits 106 extend away from the pressure sensor 100, longitudinally along the filter 50, and downwardly toward the exhaust conduits 92. The conduits 106 are fluidly coupled to the exhaust pipes 92 via couplings 108. It will be understood that while the delta pressure sensor 100 is illustrated in FIG. 10 as fluidly coupled across the aftertreatment filter 50 to provide a pressure signal indicative of the pressure differential across filter 50, either one of the conduits 106 may alternatively be routed internally to the filter 50 so that the resulting pressure signal is indicative of the pressure differential between the inlet of the filter 50 and internal to the filter, or is indicative of the pressure differential between a point internal to the filter 50 and the outlet of the filter 50.

Alternatively still, the delta pressure sensor 100 illustrated in FIGS. 10 and 11 may be replaced by one or more dedicated pressure sensors suitably positioned in fluid communication with the exhaust stream and electrically connected to the module 12. In one embodiment, for example, sensor 100 may be replaced by a pair of pressure sensors; one fluidly coupled to the exhaust gas upstream of the filter 50 and configured to provide a first pressure signal to module 12 indicative of exhaust gas pressure upstream of the filter 50, and a second fluidly coupled to the exhaust gas downstream of the filter 50 or to ambient and configured to provide a second pressure signal to module 12 indicative of exhaust gas pressure downstream of filter 50, which in some embodiments may correspond to ambient pressure. Alternatively, either one of the dedicated pressure sensors may be fluidly coupled to the exhaust gas internal to the filter 50. In applications including an existing ambient pressure sensor, system 10H may be configured to include only a single pressure sensor fluidly coupled to the exhaust gas upstream of, or internal to, the filter 50. In this embodiment, the pressure differential across filter 50, or between a point internal to the filter 50 and the outlet of filter 50, may be determined in a known manner as the difference between the pressure signal produced by the single pressure sensor and the pressure signal produced by the ambient pressure sensor. In still other embodiments, regardless of whether ambient pressure information is available via an existing sensor, system 10H may be configured to include only a single pressure sensor fluidly coupled to the exhaust gas upstream of, or internal to, filter 50.

In some embodiments, a thermal insulating device 102 may be positioned between the bracket 14E and the module 12 and the sensor 100 to provide thermal insulation between heat generated by the operation of filter 50 and module 12 and sensor 100. Additionally, air gaps may be formed between the filter 50 and the bracket 14E and/or between the bracket 14E and the module 12 and sensor 100 to further thermally insulate the module 12 (and sensor 100) from heat generated by operation of the filter 50.

Figure 12:
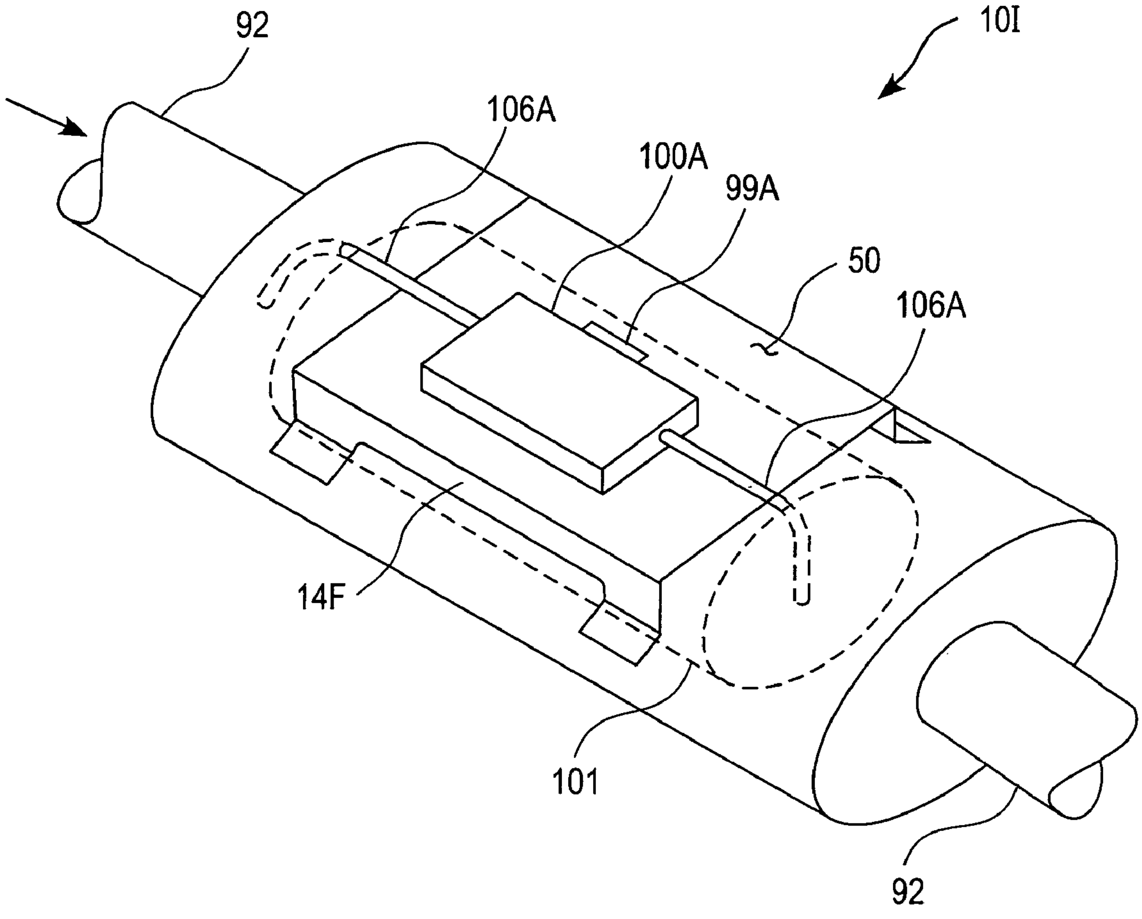
FIG. 12 is a diagrammatic illustration of yet a further embodiment of an exhaust gas aftertreatment filter system.

Referring now to FIG. 12, another illustrative embodiment of an exhaust gas aftertreatment filter system 101 includes a mounting bracket 14F secured to an aftertreatment filter 50 positioned inline with an exhaust conduit 92 and a pressure sensor 100A secured to the bracket 14F. The filter 50 includes a filter brick 101. The filter brick 101 is typically cylindrical in shape and positioned in the interior of the filter 50. The pressure sensor 100A is secured to the bracket 14F using suitable securing devices such as those devices described above in regard to FIG. 1 and is fluidly coupled to the exhaust filter 50. The pressure sensor 100A may be interfaced with other electrical components, e.g., a remote control module, via connector assembly 99A and a suitable interconnect harness (not shown). The pressure sensor 100A is a so-called "delta pressure sensor" having opposing inlets and producing a pressure signal indicative of the pressure differential between the opposing inlets. A pair of conduits 106A fluidly couple each of the opposing inlets of the delta pressure sensor 100 to the exhaust gas flowing through filter 50. In particular, a first conduit 106A extends from one inlet of the pressure sensor 100A, down through the filter 50, and terminates at one end of the brick 101. A second conduit 106A extends from the other inlet of the pressure sensor 100A, down through the filter 50, and terminates at the opposite end of the brink 101. Accordingly, the sensor 100 determines a difference in the pressure of exhaust gas at one end of the brick 101 and the pressure of exhaust gas at the opposite end of the brick 101.

Alternatively, the delta pressure sensor 100A illustrated in FIG. 12 may be replaced by one or more dedicated pressure sensors suitably positioned in fluid communication with the exhaust stream (i.e., at opposing ends of the brick 101) and each having a suitable connector assembly 99A. In one embodiment, for example, sensor 100A may be replaced by a pair of pressure sensors; one fluidly coupled to the exhaust gas at one end of the brick 101 and configured to produce a first pressure signal indicative of exhaust gas pressure at the one end of the brick 101, and a second sensor 100 fluidly coupled to the exhaust gas at the opposite end of brick 101 or to ambient and configured to produce a second pressure signal indicative of exhaust gas pressure at the opposite end of the brick 101, which in some embodiments may correspond to ambient pressure. In still other embodiments, system 101 may be configured to include only a single pressure sensor fluidly coupled to the exhaust gas at either end of the brick 101.

In some embodiments, a thermal insulating device (not shown) may be positioned between the bracket 14F and the sensor 100A to provide thermal insulation between heat generated by the operation of filter 50 and the sensor 100A. Additionally, air gaps may be formed between the filter 50 and the bracket 14F and/or between the bracket 14F and the sensor 100A to further thermally insulate the sensor 100A from heat generated by operation of the filter 50.

Figure 13:
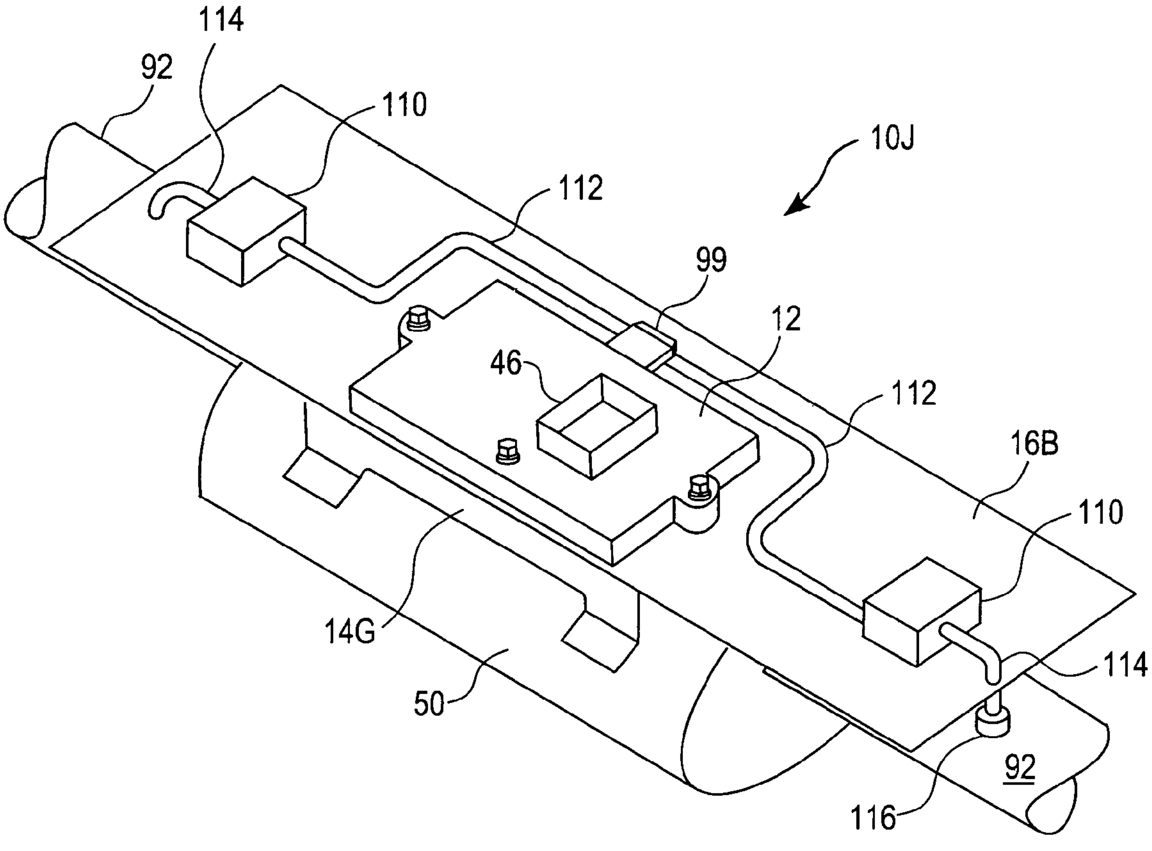
FIG. 13 is a diagrammatic illustration of yet a further embodiment of an exhaust gas aftertreatment filter system.

Referring now to FIG. 13, another embodiment of an exhaust gas aftertreatment filter system 10J includes a control module 12 mounted to the top surface 16B of a mounting bracket 14G, and a number of composition sensors 110 secured to the top surface 16B. The composition sensors 110 are electrically connected to the module 12 via a number of electrical interconnects (not shown) housed in a corresponding number of conduits 112. The interconnects (not shown) are electrically coupled to the control module 12 through a harness and connector assembly 99. The sensors 110 are fluidly coupled to the exhaust conduits 92 via conduits 114 and couplings 116 which couple the conduits 114 to the exhaust conduits 92.

The composition sensors 110 may include any one or combination of a number of different composition sensors such as Oxygen sensors, Nitrogen Oxide sensors, Sulfur Oxide sensors or other type of sensors operable to sense corresponding component levels making up the exhaust gas stream. Accordingly, the sensor modules 110 may, in some embodiments, include microprocessors and/or other electrical devices configured to process the sensor signals and determine therefrom the quantity or level of the corresponding exhaust gas component.

Any of a number of sensor configurations may be used in the exhaust gas aftertreatment filter system 10J. In one embodiment, for example, sensor 110 upstream of the filter 50 may be an Oxygen sensor, and sensor 110 downstream of the filter 50 may be an Nitrogen Oxide sensor. Other single sensor or sensor combinations are contemplated. In one embodiment, for example, system 10J may include only a single exhaust gas composition sensor 110 positioned in fluid communication with the exhaust gas upstream of, downstream of or internal to, filter 50. In other embodiments including multiple exhaust gas composition sensors, any one or more of such sensors may be positioned in fluid communication with the exhaust gas upstream of, downstream of or internal to, filter 50.

In some embodiments, a thermal insulating device (not shown) may be positioned between the bracket 14G and the module 12 and/or the sensors 110 to provide thermal insulation between heat generated by the operation of filter 50 and module 12 and sensor(s) 110. Additionally, air gaps may be formed between the filter 50 and the bracket 14G and/or between the bracket 14G and the module 12 and sensor(s) 110 to further thermally insulate the module 12 (and sensors 110) from heat generated by operation of the filter 50.

The embodiments illustrated in FIGS. 8–13 show the module 12 as including a connector 99 for electrically coupling any of the one or more gas property sensors thereto. In these embodiments, connector 99 may alternatively be omitted, and the connector 46 may instead be used to electrically couple any of the one or more gas property sensors to module 12 and also to electrically couple a remote controller or control computer to module 12 as described hereinabove.

Figure 14:
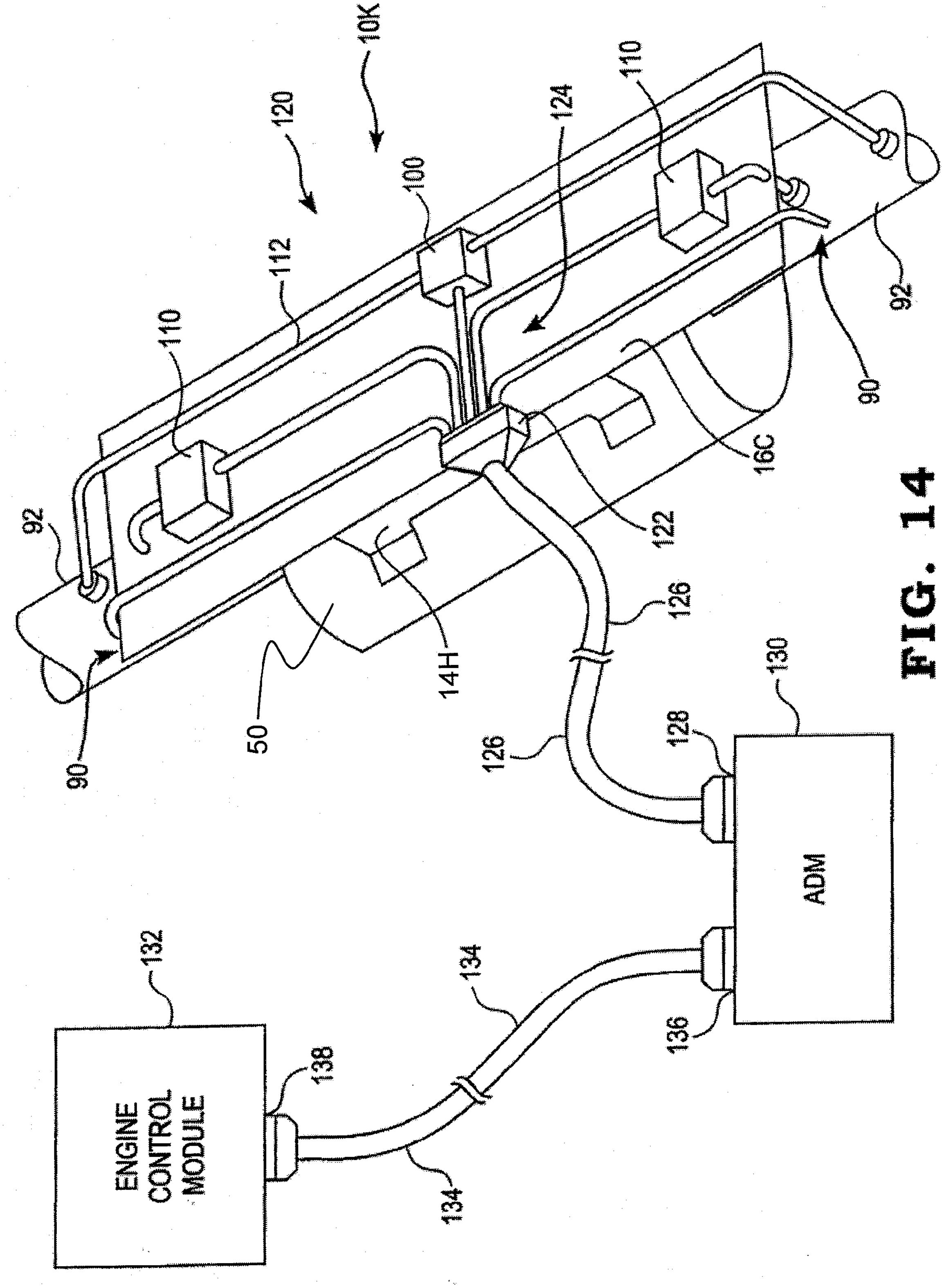
FIG. 14 is a diagrammatic illustration of yet a further embodiment of an exhaust gas aftertreatment filter system.

Referring now to FIG. 14, still another embodiment of an exhaust gas aftertreatment filter system 10K includes a mounting bracket 14H secured to an aftertreatment filter 50 positioned inline with an exhaust conduit 92, one or more sensors 120 secured to the bracket 14H, and an exhaust gas aftertreatment filter system multiplexing unit, or Aftertreatment Data Multiplexer 130 (hereinafter sometimes ADM) remotely mounted away from the bracket 14H and the filter 50. In the embodiment illustrated in FIG. 13, the sensors 120 include a pair of temperature sensors 90, a pressure sensor 100, and a pair of composition sensors 110 such as a Nitrogen Oxide sensor and an Oxygen sensor, or other combination of known exhaust gas composition sensors operable to sense quantities or levels of corresponding components in the exhaust gas composition. However, depending on the application, fewer or additional sensors 120 may be included in the filter system 10K. Each of the sensors 120 is coupled to one or both of the exhaust conduits 92 and/or internal to the filter 50. The coupling of the sensors 120 to the conduits 92 and/or the filter 50 may be made using any one or combination of the techniques described hereinabove with respect to FIGS. 8–13. The sensors 120 are each electrically coupled via a number of interconnects (not shown) to a connector assembly 122 secured to the top surface 16C of the mounting bracket 14H. The interconnects (not shown) are routed through a number of conduits 124 which provide protection and guidance to the interconnects (not shown).

In the embodiment illustrated in FIG. 14, connectors 122 and 128 may be any known connectors correspondingly associated with the sensors 120 and ADM 130 respectively, and interconnected via a suitable number of interconnects 126. The ADM 130 includes electrical devices useful in, for example, multiplexing and routing the sensory signals produced by the various exhaust gas property sensors 120 to an engine control module 132 configured to manage operation of the engine or other on-board control computer. In the illustrated embodiment, ADM 130 is connected in data communication with the engine control module 132 via an SAE J1939 hardware interconnect 134, 136, 138 in accordance with SAE J1939 communications protocol. Alternatively, other types of known hardware interconnects and communication protocols to carry out communications between ADM 130 and control module 132. Examples include, but are not limited to, an SAE J1708 hardware interconnect configured for communications according to SAE J1587 communications protocol, an RS-232 hardware interconnect configured for communications according to RS-232 communications protocol, a Universal Serial Bus (USB) hardware interconnect configured for communications according to USB communications protocol, or the like. The exhaust gas aftertreatment system 10K illustrated in FIG. 14 thus provides interconnectivity between the sensors 120 and the engine control module 132 via ADM 132.

In operation, the sensors 120 sense various exhaust gas property conditions such as gas temperature, pressure, gas component composition and the like. Some sensors, such as the pressure sensor 100 and the composition sensors 110, may include microprocessors and other electrical devices to process or pre-process the sensor data. Such sensors may determine additional operating data based on the sensed operating conditions such as delta-pressure. The values of the exhaust gas properties and any additional operating data sensed and determined by the sensors 120 are transmitted from the sensors 120 to the ADM 130 via the harness 126. The ADM 130 may further analyze the received data values and determine additional information based on such values. The ADM 130 may transmit the data values along with other signals such as control and status signals to the engine control module 132 via the interconnect 134. Based on such data values, control signals, and status signals, the engine control module 132 may adjust the operating conditions of the engine.

It should be understood that in the embodiment illustrated in FIG. 14, the various exhaust gas property sensors 120 (and/or actuators) may alternatively be mounted to, or about, filter 50 in a conventional manner (without mounting plate 14H) and electrically coupled to ADM 130 via individual or groups of electrical interconnects. Alternatively still, the various exhaust gas property sensors 120 (and/or actuators) may be mounted to, and/or about, the mounting plate 14H as illustrated and electrically connected directly to the electronic control module 132 (bypassing ADM 130) via interconnect 126 or 134.

It should further be noted that while the embodiments illustrated in FIGS. 8–14 show a number of exhaust gas property sensors mounted to and/or about the mounting plate 14D, 14E, 14F, 14G, 14H in fluid communication with the exhaust gas conduit upstream and/or downstream of the filter 50 and/or with the filter 50 itself, it is contemplated that one or more exhaust gas aftertreatment filter actuators may alternatively or additionally be mounted to or about any of the mounting plate embodiments 14, 14A–H in fluid communication with the exhaust gas conduit upstream and/or downstream of the filter 50 and/or with the filter 50 itself. For example, any of the illustrated embodiments may include one or more bypass valves and bypass conduits configured to selectively route exhaust gas to or around one or more exhaust gas aftertreatment filters. As another example, any of the illustrated embodiments may include one or more injectors configured to inject one or more substances; e.g., Urea, hydrocarbon (e.g., fuel), etc., into the exhaust gas stream. Actuators for controlling operation of such one or more injectors may include, for example, but are not limited to, any one or more of a conventional dosing actuator, a conventional shut off valve, and the like. The actuators for such bypass valves and/or injectors may be mounted to or about any of the mounting plate embodiments described herein and electrically connected to the module 12, which would be a controller in such cases, and/or to the ADM 130 (FIG. 14) according to any of the mounting and interconnect routing techniques described hereinabove.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the various embodiments illustrated herein show and describe protective conduits for routing interconnects between sensors (and/or actuators) and module 12, such conduits may alternatively be replaced with a number of standoffs that act to route the interconnects between the various sensors (and/or actuators) and module 12 while also maintaining such interconnects away from contact with the filter 50 and/or exhaust conduit 92. As another example, any of the mounting plate embodiments illustrated and described herein, e.g., 14, 14A, 14B, 14C, 14D, 14E, 14F, 14G, 14H, may in some embodiments be integral with, or defined by, or combined with a conventional muffler or aftertreatment filter heat shield that is typically attached to, yet spaced apart from, the muffler or aftertreatment filter. In such embodiments, an additional mounting plate thus need not be provided, and instead the existing heat shield may be used, modified or unmodified, to mount the module 12 and/or various sensors and/or actuators thereto. Such conventional heat shields are typically constructed of sheet metal or the like, and may selectively define a number of holes therethrough as is known in the art. As another example, it will be understood that the term "aftertreatment filter" used herein may be or include any one or combination of a NOx filter or adsorber, a particulate filter, an exhaust gas muffler, a catalytic converter, a close-coupled catalyst, or any other exhaust gas processing mechanism disposed in-line with any portion of an exhaust gas conduit extending between an exhaust manifold of the engine and ambient.

What is claimed is:

1. An arrangement for mounting at least one electrical component to an aftertreatment filter disposed in-line with an exhaust gas conduit coupled to an internal combustion engine, the arrangement comprising a mounting bracket defining a mounting surface and at least one leg extending from the mounting bracket, the at least one leg defining a mounting foot at a distal end thereof with the mounting foot of the at least one leg and the mounting surface of the mounting bracket defining a first air gap therebetween, the mounting foot of the at least one leg secured to the aftertreatment filter and the at least one electrical component secured to the mounting surface of the mounting bracket.

2. The arrangement of claim 1, wherein the mounting bracket includes a number of conduits for routing electrical interconnects therethrough.

3. The arrangement of claim 1, wherein the mounting bracket includes a heat sink structure for drawing heat away from the mounting bracket.

4. The arrangement of claim 1, wherein the aftertreatment filter has a first end and a second end opposite the first end, and wherein the mounting surface of the mounting bracket extends beyond at least one of the first and second ends of the aftertreatment filter.

5. The arrangement of claim 1, wherein the mounting foot of the at least one leg is configured to be secured to the filter by a strap extending about the filter.

6. The arrangement of claim 1, wherein the mounting foot of the at least one leg is configured to be secured to the filter by a weld between the mounting foot and the aftertreatment filter.

7. The arrangement of claim 1, wherein the mounting foot of the at least one leg is configured to be secured to the filter by a fastener.

8. The arrangement of claim 1, wherein the at least one electrical component includes an exhaust gas aftertreatment filter system control module.

9. The arrangement of claim 8, wherein the control module includes a body portion having a top and bottom side and at least one mounting protrusion extending below the bottom side so as to define a second air gap between the bottom side and the mounting surface of the mounting bracket when the control module is secured to the mounting surface of the mounting bracket.

10. The arrangement of claim 8, wherein the control module is electrically coupled to a number of exhaust gas property sensors.

11. The arrangement of claim 8, further comprising a cooling system having a cooling element coupled to the control module, the cooling system controlling an operating temperature of the control module.

12. The arrangement of claim 11, wherein the cooling system further includes a fluid reservoir holding a cooling fluid, the cooling reservoir coupled to the cooling element via a number of fluid conduits.

13. The arrangement of claim 1, wherein the at least one electrical component includes an exhaust gas pressure sensor.

14. The arrangement of claim 13, wherein the exhaust gas pressure sensor includes an electrical connector for electrically coupling the pressure sensor to other electrical components.

15. The arrangement of claim 13, wherein the exhaust gas pressure sensor has a first inlet coupled to one of the exhaust gas conduit upstream of the filter relative to an exhaust gas flow through the exhaust gas conduit and the exhaust conduit downstream of the filter relative to the exhaust gas flow through the exhaust gas conduit.

16. The arrangement of claim 15, wherein the exhaust gas pressure sensor is a delta pressure sensor having a second inlet coupled to the other of the exhaust gas conduit upstream of the filter relative to the exhaust gas flow through the exhaust gas conduit and the exhaust conduit downstream of the filter relative to the exhaust gas flow through the exhaust gas conduit, the delta pressure sensor producing a pressure signal indicative of a pressure differential between the first and second inlets.

17. The arrangement of claim 16, wherein the aftertreatment filter includes a filter brick disposed therein, the filter brick having an upstream end and a downstream end relative to an exhaust gas flow, the first inlet of the delta pressure sensor coupled to the filter adjacent to the upstream end of the filter brick and the second inlet of the delta pressure sensor coupled to the filter adjacent to the downstream end of the filter brick.

18. The arrangement of claim 13, wherein the at least one electrical component further includes an aftertreatment system control module mounted to the mounting surface of the mounting bracket, the aftertreatment system control module electrically coupled to the exhaust gas pressure sensor.

19. The arrangement of claim 1, wherein the at least one electrical component includes an exhaust gas composition sensor.

20. The arrangement of claim 19, wherein the exhaust gas composition sensor is one of an Oxygen sensor, a Nitrogen Oxide sensor, and a Sulfur Oxide sensor.

21. The arrangement of claim 19, wherein the exhaust gas composition sensor includes an inlet coupled to one of the exhaust gas conduit upstream of the filter relative to an exhaust gas flow through the exhaust gas conduit and the exhaust conduit downstream of the filter relative to the exhaust gas flow through the exhaust gas conduit.

22. The arrangement of claim 21, wherein the at least one electrical component further includes an aftertreatment system control module mounted to the mounting surface of the mounting bracket, the aftertreatment system control module electrically coupled to the exhaust gas composition sensor.

23. The arrangement of claim 1, wherein the at least one electrical component includes a first exhaust gas composition sensor having an inlet coupled to the exhaust conduit upstream of the filter relative to an exhaust gas flow through the exhaust gas conduit and a second exhaust gas composition sensor having an inlet coupled to the exhaust conduit downstream of the filter relative to the exhaust gas flow through the exhaust gas conduit.

24. The arrangement claim 1, wherein the at least one electrical component includes a temperature sensor coupled to one of the exhaust conduit upstream of the filter relative to an exhaust gas flow through the exhaust gas conduit and the exhaust conduit downstream of the filter relative to the exhaust gas flow through the exhaust gas conduit.

25. The arrangement of claim 24, wherein the mounting bracket includes a number of conduits for routing electrical interconnects, the temperature sensor electrically connectable to other electrical components via a number of electrical interconnects routed through the number of conduits.

26. The arrangement of claim 24, wherein the at least one electrical component further includes an aftertreatment filter system control module mounted to the mounting surface of the mounting bracket, the control module electrically coupled to the exhaust gas temperature sensor.

27. The arrangement of claim 1, wherein the at least one electrical component includes a first exhaust gas temperature sensor coupled to the exhaust conduit upstream of the filter relative to an exhaust gas flow through the exhaust gas conduit and a second exhaust gas temperature sensor coupled to the exhaust conduit downstream of the filter relative to the exhaust gas flow through the exhaust gas conduit.

28. The arrangement of claim 1, further comprising a thermal insulating device disposed between a bottom side of the at least one electrical component and the mounting surface of the mounting bracket, the thermal insulating device insulating the at least one electrical component from heat generated by the aftertreatment filter.

29. The arrangement of claim 1, further comprising a thermal insulting device positioned between the mounting foot of the at least one leg extending from the mounting bracket and the aftertreatment filter, the thermal insulating device insulating the at least one electrical component from heat generated by the aftertreatment filter.

30. The arrangement of claim 1, further including an exhaust gas aftertreatment filter system multiplexing unit mounted to the mounting surface of the mounting bracket, the multiplexing unit electrically coupled to the at least one electrical component.

31. The arrangement of claim 30, wherein the multiplexing unit is further electrically coupled to an engine control module of an internal combustion engine.

32. The arrangement of claim 31, wherein the multiplexing unit and the engine control module are coupled in data communication via a predefined hardware interconnect.

33. The arrangement of claim 1 wherein the mounting bracket defines a plurality of legs extending therefrom, each of the plurality of legs defining a mounting foot at a distal end thereof, the mounting foot of each of the plurality of legs and the mounting surface of the mounting bracket defining the first air gap therebetween, the mounting foot of each of the plurality of legs secured to the aftertreatment filter.

34. An arrangement for mounting at least one electrical component to an aftertreatment filter disposed in-line with an exhaust gas conduit coupled to an internal combustion engine, the arrangement comprising a mounting bracket defining a first mounting surface secured to the aftertreatment filter and a second mounting surface, the at least one electrical component mounted to the second mounting surface of the mounting bracket with an air gap defined therebetween such that the air gap extends between the at least one electrical component and the aftertreatment filter.

35. An arrangement for mounting at least one electrical component to an aftertreatment filter disposed in-line with an exhaust gas conduit coupled to an internal combustion engine, the arrangement comprising:

a mounting bracket defining a first mounting surface secured to the aftertreatment filter and a second mounting surface, and a thermal insulating member extending over the second mounting surface of the mounting bracket, the at least one electrical component mounted to the second mounting surface of the mounting bracket with the thermal insulating member disposed therebetween.

* * * * *